(12) United States Patent
Schlecht

(10) Patent No.: US 7,316,443 B2
(45) Date of Patent: Jan. 8, 2008

(54) REAR WINDOW ROLLER BLIND WITH COMPLETE SPLIT COVERAGE BY THE PULL-OUT ELEMENT

(75) Inventor: Werner Schlecht, Aurich (DE)

(73) Assignee: BOS GmbH & Co. KG, Ostfildern (DE)

( * ) Notice: Subject to any disclaimer, the term of this patent is extended or adjusted under 35 U.S.C. 154(b) by 44 days.

(21) Appl. No.: 11/452,822

(22) Filed: Jun. 14, 2006

(65) Prior Publication Data

US 2006/0290162 A1 Dec. 28, 2006

(30) Foreign Application Priority Data

Jun. 23, 2005 (DE) .................. 10 2005 029 559

(51) Int. Cl.
*B60J 3/00* (2006.01)

(52) U.S. Cl. .................. 296/97.8; 160/370.22; 296/98

(58) Field of Classification Search ......... 296/97.8, 296/98, 143; 160/370.22, 107, 178.1 R, 160/89, 176.1 R, 280

See application file for complete search history.

(56) References Cited

U.S. PATENT DOCUMENTS

| | | | |
|---|---|---|---|
| 4,836,263 A * | 6/1989 | Ament | 160/370.22 |
| 5,067,546 A * | 11/1991 | Jeuffray et al. | 160/370.22 |
| 5,201,810 A * | 4/1993 | Ojima et al. | 160/370.22 |
| 5,404,926 A * | 4/1995 | Ojima et al. | 296/97.4 |
| 5,423,588 A * | 6/1995 | Eglinton | 296/98 |
| 6,086,133 A * | 7/2000 | Alonso | 296/97.8 |
| 6,598,929 B2 * | 7/2003 | Schlecht et al. | 296/97.8 |
| 6,739,375 B2 * | 5/2004 | Schlecht et al. | 160/370.22 |
| 6,796,599 B2 * | 9/2004 | Schlecht et al. | 296/143 |
| 6,848,493 B1 * | 2/2005 | Hansen et al. | 160/370.22 |
| 6,968,887 B2 * | 11/2005 | Hansen et al. | 160/370.22 |
| 7,089,992 B2 * | 8/2006 | Walter et al. | 160/370.22 |
| 2001/0017194 A1 * | 8/2001 | Schlecht et al. | 160/370.22 |
| 2002/0059989 A1 * | 5/2002 | Schlecht et al. | 160/370.22 |
| 2004/0012225 A1 * | 1/2004 | Schlecht et al. | 296/143 |
| 2004/0066059 A1 * | 4/2004 | Schlecht et al. | 296/138 |
| 2005/0051285 A1 * | 3/2005 | Yano et al. | 160/370.22 |
| 2005/0263257 A1 * | 12/2005 | Hansen et al. | 160/370.22 |
| 2006/0237152 A1 * | 10/2006 | Hansen et al. | 160/370.22 |
| 2007/0144689 A1 * | 6/2007 | Walter et al. | 160/370.22 |

* cited by examiner

*Primary Examiner*—Kiran B. Patel
(74) *Attorney, Agent, or Firm*—Leydig, Voit & Mayer, Ltd.

(57) ABSTRACT

A rear-window roller blind assembly for motor vehicles in which the roller blind is movable out of a pull-out slit to an extended position through movement of a pull-out element on a free edge thereof. The pull-out element includes a center piece and relatively movable end pieces shaped so that when the pull-out element is in a retracted position the pull-out slit is covered over its entire length by the pull-out element.

27 Claims, 4 Drawing Sheets

REAR WINDOW ROLLER BLIND WITH COMPLETE SPLIT COVERAGE BY THE PULL-OUT ELEMENT

FIELD OF THE INVENTION

The present invention relates generally to window shades for motor vehicles, and more particularly, to motor vehicle window shades that are automatically extendable and retractable.

BACKGROUND OF THE INVENTION

Today, expensive sedans are predominantly equipped with standard rear-window roller blinds. Such rear-window roller blinds are arranged invisibly under the rear-seat shelf. The roller blinds include a wind-up shaft rotatably mounted under the rear-seat shelf, with one end of the roller blind being fixed on the wind-up shaft. The other end of the roller blind is anchored on a pull-out element or rod. The pull-out element is guided at its opposite ends in guide rails which now are integrated into the side lining of the car body of C-columns.

Due to the car body shape, the width of the rear window near the mid-line, that is, just above the bottom edge and thus at the height of the rear-seat shelf, is greater than near the roof edge. This results in a changing spacing of the guide rails from each other. The pull-out element is adapted for this situation by having telescoping, movable end pieces.

For aesthetic and safety reasons, it is useful to close the slit through which the roller blind extends when the roller blind is completely wound up. In the past this was achieved by a cover, which is hinged to one of the edges of the slit and is either pushed open against the effect of a spring when extending the blind or closed against the effect of a spring when retracting the blind. The assembly-related expense for mounting such slit covers is not insignificant.

OBJECTS AND SUMMARY OF THE INVENTION

It is an object of the present invention to provide a rear window roller blind that is affective for closing the roller blind pull-out slit upon retraction of the roller blind without the necessity for an auxiliary cover.

The rear window roller blind of the present invention, consistent with the prior art, includes a wind-up shaft to which one end of the roller blind is fixed. The other end of the roller blind opposite the wind-up shaft is connected to a pull-out element. The pull-out element is assembled from a center piece and two end pieces that can move relative to the center piece. Pursuant to an important aspect of the invention, the center piece and the movable end pieces are shaped or dimensioned so that they close the window blind pull-out slit when the roller blind is retracted. In other words, when the roller blind is retracted, the length of the pull-out element corresponds to the length of the slit. Measured between the guide rails, the width of the pull-out element is equal to the width of the slit for the roller blind, or is wider than this slit, at all points. In contrast, when the roller blind is extended, the length of the pull-out element shortens according to the spacing of the guide rails from each other.

The foregoing arrangement makes an additional cover, or side covers, for closing the slit unnecessary as used in the past when the slit was closed by the center piece, but the end regions of the slit remained open. If the pull-out element is guided on its ends in guide rails, the slit extends over the entire width of the rear-seat shelf. The guide rails are advantageously integrated into the inner lining of the vehicle, which leads to a pleasing overall appearance. To close the slit effectively, the pull-out element can either be as wide as the slit or it can be slightly wider than the slit. In one case, the pull-out element can be inserted into the slit, while in the other case, the pull-out element lies on top of the slit. The latter variant is not sensitive to assembly tolerances.

An especially durable arrangement is created when the center piece of the pull-out element is an aluminum extrusion-molded profile. The center piece can include a continuous lengthwise chamber for limiting weight and for guiding the end pieces. The center piece also can include two guide grooves on its sides, which also are continuous over the length of the pull out element. The pull-out element advantageously further contains a continuous groove in which the roller blind is anchored.

The length of the center piece of the pull-out element corresponds, at least approximately, to the length of the edge of the roller blind away from the wind-up shaft. The center piece advantageously has an outer outline, the height of which is small relative to the width, measured perpendicular to the longitudinal axis of the center piece.

An especially good anchoring of the end pieces is achieved when parts of the given end piece run in the lateral grooves of the center piece. In the simplest case, the end piece shape approximates a flat bowl with a base and a collar formed on this base. The collar is provided with a lengthwise slit, which is defined by two slit edges. At least one of the slit edges is housed in at least one of the lateral grooves of the center piece.

A guide piece, which projects outwardly of the guide lengthwise, is connected to the base of the end piece. Advantageously, the end piece is locked in the guide piece. For guiding movement of the end piece, there is a guide bar, which projects out of the end piece towards the center piece. The guide bar can telescope lengthwise into a corresponding chamber of the center piece.

In order to force the end pieces to move in the same direction relative to the center piece, a toothed rack may be connected to each end piece. The two toothed racks are coupled to each other fit by means of a central rotatable gear so that a differential gear is formed.

For moving the roller blind, an electric motor can be provided that drives a gear via a mechanism that is coupled with a positive fit to linear slide elements, run in the guide rails.

Other objects and advantages of the invention will become apparent upon reading the following detailed description and upon reference to the drawings, in which:

Figure 1:
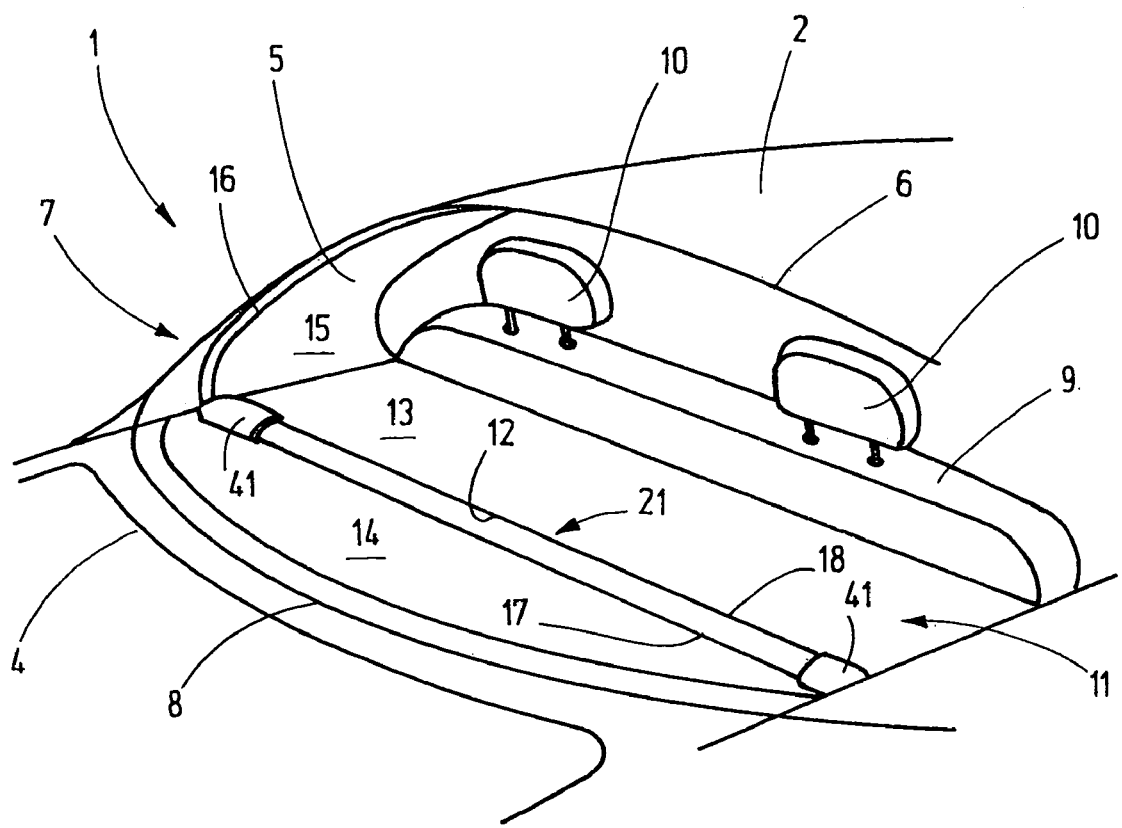
FIG. 1 is a diagrammatic depiction of part of a motor vehicle having a rear window roller blind in accordance with the invention, in this instance shown in a retracted position.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to FIG. 1 of the drawings, there is shown a rear section 1 of a motor vehicle, in this case a notched back sedan, having a rear window roller blind in accordance with the invention. The illustrated motor vehicle has a roof 2, a trunk lid 4, and apposed C-shaped columns 5 between the trunk lid 4 and roof 2. The vehicle has a rear window 7 having an upper edge 6 and a lower edge 8. In front of the rear window, a rear seat back 9 of a rear seat bench is located, which has head supports 10 mounted upright on the upper edge of the rear seat bench 9 in a known way.

A rear seat shelf 11, which is divided by a pull-out slit 12 into a front section 13 and a rear section 14, extends between the rear side of the rear-seat back 9 and the lower edge 8 of the rear window 7. The pull-out slit 12 extends from an inner lining 15 of the left C-column 5 up to a similar C-column (not shown) on the opposite side of the vehicle. A guide rail 16 is integrated into the inner lining 15, and corresponding guide rail is located in the opposite C-column. The guide rails 15 begins under the rear seat shelf 11 and extends up to the vicinity of the roof upper edge 6.

Figure 2:
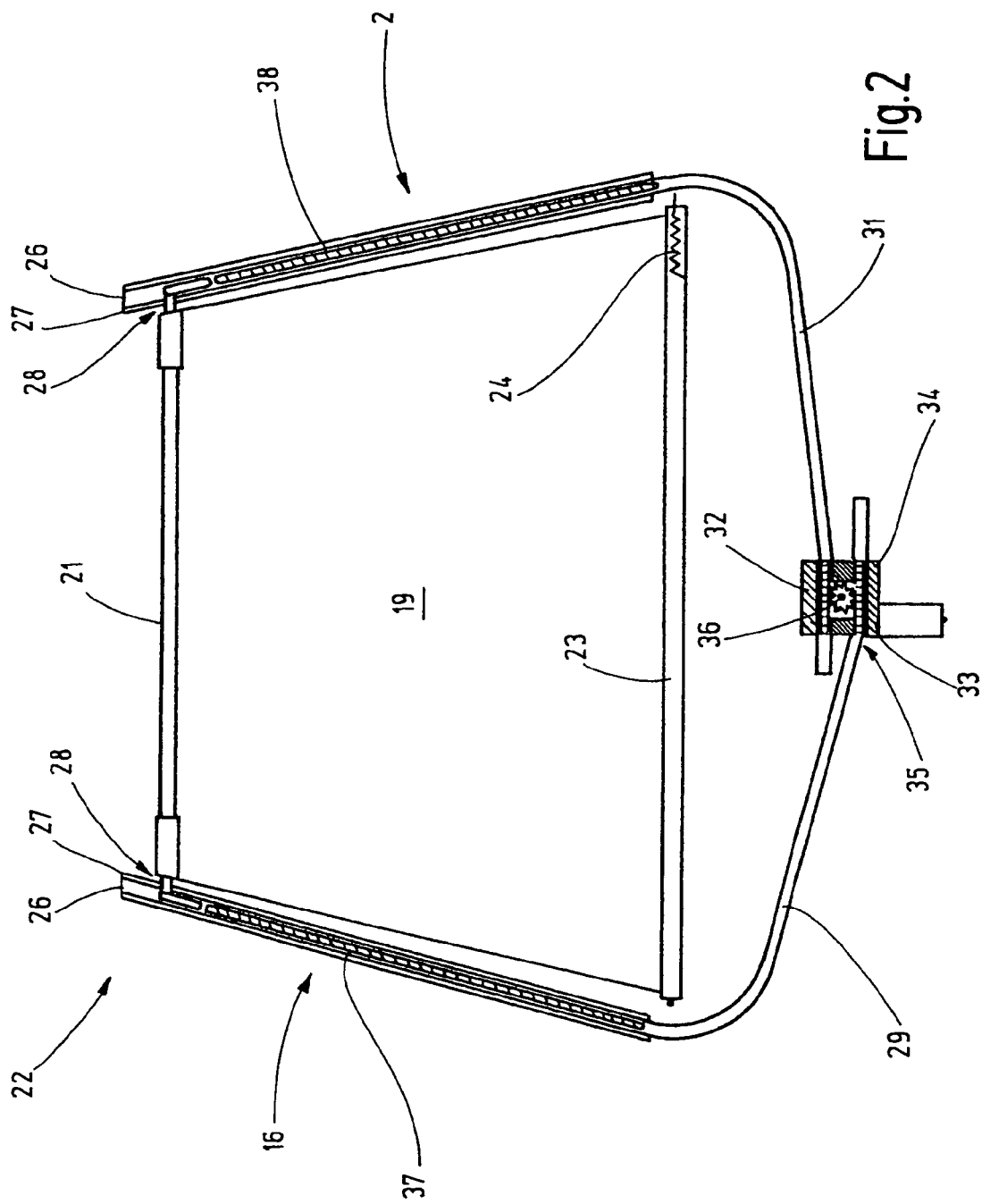
FIG. 2 is a diagrammatic depiction of the actuating mechanism for moving the pull out element of the illustrated roller blind to an extended pulled out position.

The pull-out slit 12 is defined by two parallel slit edges 17, 18. The pull-out slit 12 is used for extending a roller blind 19, as depicted in FIG. 2, and is completely covered or closed by a pull-out element or profile 21 when the roller blind is retracted. The coverage of the pull-out slit 12 extends from the inner lining 15 up to the inner lining on the opposite side, with the exception of a slight gap between the end of the pull-out profile and the adjacent inner lining 15 in order to enable interference-free movement.

The rear-window roller blind 22 includes the pull-out element 21 to which the roller blind 19 is fixed with one edge. The other edge of the roller blind is connected to a tubular wind-up shaft 23, which is rotatably supported at it ends under the rear seat shelf 11. Within the wind-up shaft 23 a spring motor 24 is provided, which biases the wind-up shaft 23 in a winding up direction of the roller blind 19 onto the wind-up shaft 23. The spring motor 24 is connected on one end to the wind-up shaft 23 and fixed on an other end to a structure of the car body.

The pull-out element 21 is guided at its ends in guide rails 16 contained in the cutaway C-columns. The two guide rails 16 are aligned with each other and lie in a common surface, whose generatrix is a straight line. In practice they follow, at least approximately, the profile of the side edge of the rear window 7.

Each guide rail 16 has a guide groove which includes a groove chamber 26 and a groove slit 27. The width of the groove chamber 26 is greater than the width of the groove slit 27. The pull-out element 21 projects into the guide rails 16 by means of corresponding guide pieces 28.

Stiff guide tubes 29, 31 connect a corresponding groove chamber 26 of a respective guide rail 16 to an associated bore hole 32, 33 in a gear housing 34 of a gear motor 35. An output gear 36 is rotatably driven by the gear motor 35, which in turn drives two elastic and bendable linear slide elements 37, 38. The two slide elements 37, 38 have the shape of a toothed rack with a circular cross section and helical toothing. Its pitch of the helical teeth corresponds to the pitch of the output gear 36. Because the two slide elements 37, 38 engage on diametrically opposite sides of the output gear 36, they are pushed forward or pulled back in opposing ways with the same speed when the gear motor 35 is operated.

Figure 3:
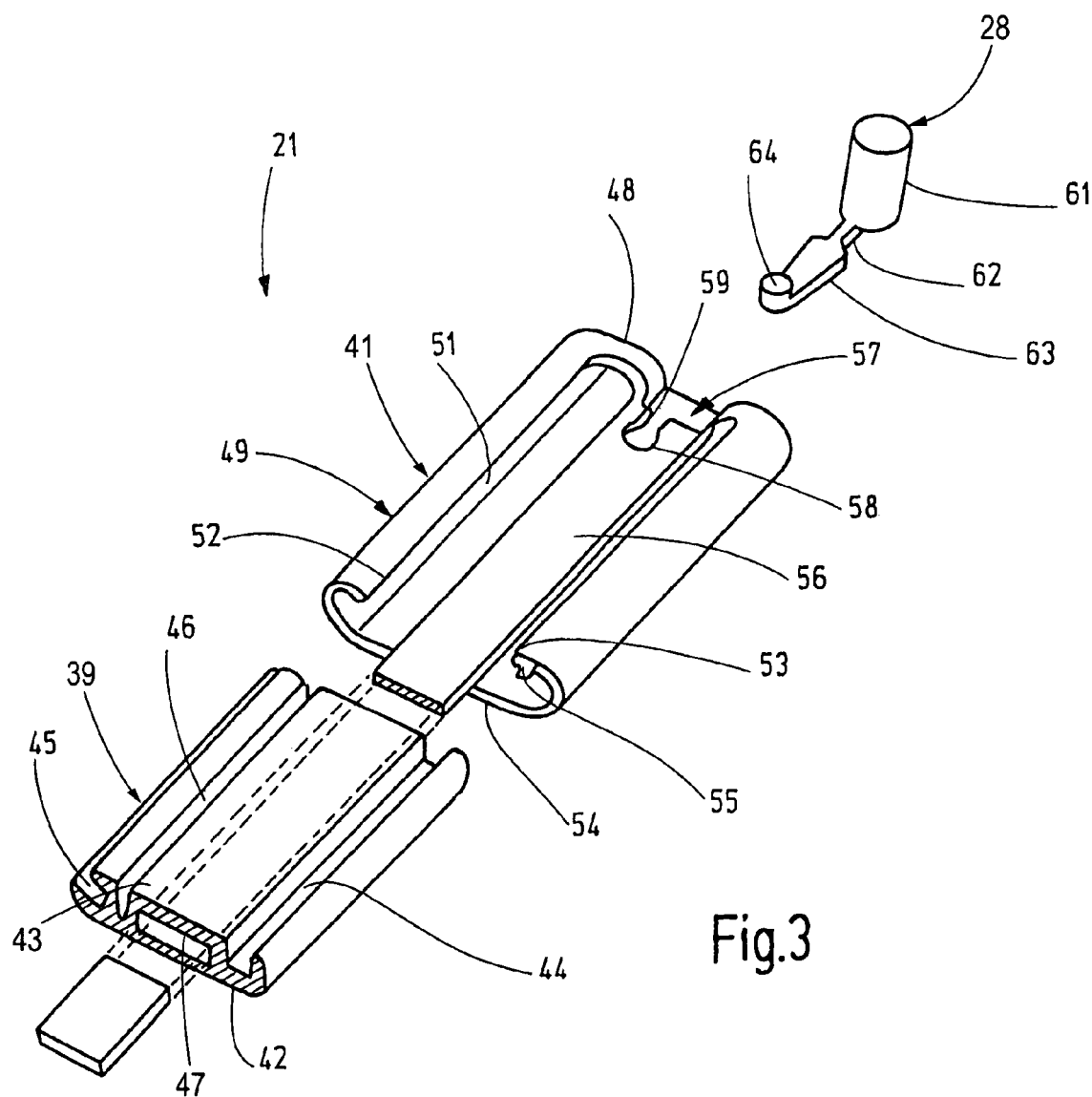
FIG. 3 is an enlarged perspective of a section of a center piece, as well as an end piece, of the pull-out element of the illustrated window roller blind.

The pull-out element or profile 21, as depicted in FIG. 3, includes a center piece 39 (only a section of which is shown) and two end pieces 41, (only one of which is shown). The associated guide piece 28 for the respective end pull out element is connected to the end piece 41. The center piece 39 can be straight, as shown, or slightly curved, in order to take into account the profile of the rear window in the transverse direction.

The illustrated center piece 39 is a straight aluminum extrusion profile with an elongated cross-section. The center piece 39 has an essentially smooth or flat top side 42 facing away from the observer in FIG. 3 and a bottom side 43 facing the observer. The top and bottom sides 42, 43 are essentially parallel to each other. The width of the center piece 39 is dimensioned so that it either fits between the edges 17, 18 of the pull-out slit 12, as can be seen in FIG. 1, or the width is somewhat greater than the width of the slit 12. In the latter case, the center piece 39 lies on top of the slit edges 17, 18 when the rear-window roller blind 22 is retracted. Viewed over its length, the center piece 39 has a constant cross section.

Two guide grooves 44, 45 extend over the length of the center piece 39. The guide groove 44 runs next to one side edge 17 of the slit 12 and opens towards the bottom side 43, while the other guide groove 45 opens towards the opposite narrow side. In addition to the guide groove 45, the center piece 39 has an attachment groove 46 on the bottom side 43. The roller blind 19 is anchored with its upper edge in this attachment groove. A guide channel 47 with a rectangular cross section extends lengthwise between the attachment groove 46 and the guide groove 44. The guide channel 47 is closed on all sides about its periphery.

In the broadest sense, the end piece 41 has the shape of a bowl with a base 48 and a thin-walled collar 49 formed on the base 48. The collar has a wide slit 51, which is defined by two slit edges 52, 53 and which runs lengthwise in the end piece 41. The collar 49, as can be seen, curls inward near the slit edge 52, such that the end piece 41 is guided in a sliding manner by the slit edge 52 or with the part of the collar 49 that borders this slit edge in the groove 45.

From the slit edge 53, the collar 49 is curved like a half-cylinder and then transitions into an essentially flat roof section 54. A bar 55 pointing inwardly is attached directly adjacent to the slit edge 53. The bar 55 slides in the guide groove 44, while the short section projecting part of the bar 55 overlaps the rest of the guide groove 44 between the slit edge 53 and the bar 55.

A guide rod 56, which has a rectangular cross section and which runs in the guide channel 47, extends from the base 48 of the end piece 41. The guide rod 56 is anchored only on its outer end, while it is otherwise on all sides relative to the collar 49 at a distance from this anchor. In particular, there is a continuous gap between the inner side of the roof 54 and the adjacent flat side of the guide rod 56. This gap begins at the free end of the collar 49 and extends directly up to the base 48.

The end piece 41, including the guide rod 56, preferably is a plastic molded part injection-molded as one piece. In the assembled state, the collar 49 surrounds the center piece 39 peripherally with the exception of a rectangular region of the bottom side 43 corresponding to the width of the slit 51. The collar 49 follows the contours of the cross section of the center piece 39.

At the end of the rod 56, the end piece 41 includes a pocket 57 used for anchoring the guide piece 28. In one side wall of the pocket 57 there is a circular opening 58, which is accessible from the open end of the pocket 57 via a slit 59. The guide piece 28, which consists of a one-piece plastic molded part, sits in the pocket 57. The guide piece 28 has a cylindrical guide body 61, the cross section of which is adapted to the cross section of the groove chamber 26 in the guide rails 16. On one end of the guide element 61, there is a throat section 62, which fits through the groove slit 27. The throat section 62 transitions into an arm, which carries a short peg or bolt 64 on its free end. In the assembled state, the arm 23 sits in the pocket 57, while the peg 64 is locked in the catch opening 58. Assembly is effected by the catch peg 64 being forced through the slit 59 until the peg 64 is locked in the opening 58. In the assembled state, the arm 63 projects outwards past the base 48 of the end piece 41 as a direct extension of the guide rod 56. Therefore, the guide element 61 is spaced away from the base of the end piece 41 so that during operation the base 48 cannot scrape against the inner lining 15, but the slit 12 is adequately closed.

When the two end pieces 41 sit aligned with the center piece 39 at its opposite ends, the guide rod 56 slides with slight play and without jamming in the guide channel 47. Because the guide rod 56 can telescope in the center piece 39, the effective length of the pull-out element 21, i.e., the spacing between the two guide elements 61, can be adapted to the corresponding spacing between the groove chambers 26 of guide rails 16, corresponding to the position of the pull-out element 21 along the guide rails 16.

The theoretical gap between the end of the center piece 39 and the guide piece 28 is visually covered on the top side by the collar 49 of the end piece 41. Here, the collar 49 is guided with its slit edge 52 in the guide groove 45, while the bar 55 engages in the guide groove 44. The roof 54 pointing downwards in FIG. 3 faces upwards in the position of use.

The pocket 57 is arranged centrally in an end of the guide rod 56. By virtue of the arrangement of the pocket 57, the smallest possible rocking forces are generated when a force is exerted on the end piece 28 parallel to the longitudinal axis of the center piece 39.

If the rear-window roller blind 22 equipped with such a pull-out element 21 is installed in a vehicle, it can be seen that the pull-out slit 12 can be closed or covered to a great extent, at least to the extent that no parts can fall through the pull-out slit 12 or that no one, children in particular, can insert a finger into any open gap between the pull-out profile 21 and the pull-out slit 12. When the rear-window roller blind 22 is retracted, as shown in FIG. 1, the two end pieces 41 assume their maximum outer position relative to the center piece 39. Thus they cover each part of the pull-out slit 21, which the center piece cannot cover due to its fixed length. The length of the center piece 39 is dimensioned so that the pull-out element fits between the guide rails 16 when the pull-out element is at the upper end of the guide rails 16 where they have the smallest spacing from each other due to the drawn-in car body contours.

For extending the rear-window roller blind 22, the gear motor 35 is rotatably driven, whereby the slide elements 37, 38 are set in motion towards the upper end of the guide rails 16. In this way, they push the guide elements 61 of the pull-out element 21 in front of themselves. The pull-out element 21 thereby moves towards the upper edge 6 of the rear window 7, whereby the roller blind 19 is simultaneously pulled up from the wind-up shaft 23. The spring motor 34 acting in the opposite direction keeps the roller blind 19 tensioned.

For retracting the roller blind 19, the gear motor 35 is driven in the opposite direction of rotation. In this way, the slide elements 37, 38 are pulled back from the guide rails downward towards the wind-up shaft 23. The spring motor 34 contained in the wind-up shaft 23 winds the roller blind 19 on the wind-up shaft 23 correspondingly as much as the position of the slide elements 37, 38 permits.

The ends retract when the pull-out element 21 contacts the slit edges 16, 17. When the window roller blind 22 is extended, the length of pull-out profile 21 is retracted accordingly. Because the spacing between the guide rails 16, 25 constantly decreases during this movement, the two end pieces 41 move towards the center piece 39. The guide bars 56 move into the center piece 39 with a telescoping motion.

The mechanical force transfer from the slide elements to the roller blind 19 does not occur by means of the collar 49, but instead exclusively by means of the guide rod 56. The positive-fit connection between the slit edges 52, 53 and the center piece 39 guide the collar on the center piece 39 only when someone inadvertently pushes against the end piece 41. Due to this arrangement, the center piece 39 is surrounded in the corresponding region by the end piece 41 via its collar 49 wherein only a part of the bottom side 43 remains free so that the collar 49 does not collide with the roller blind 19, which is connected to the center piece over the entire length of the center piece 39.

In the illustrated embodiment as depicted in FIG. 3, the guide bars 56 project into the center piece 39 by such an extent that only non-jamming, telescoping motion is possible. The center piece 39 is mounted in a floating way and is inevitably positioned between the guided end pieces 41 due to the lateral guide forces of the roller blind 19.

Figure 4:
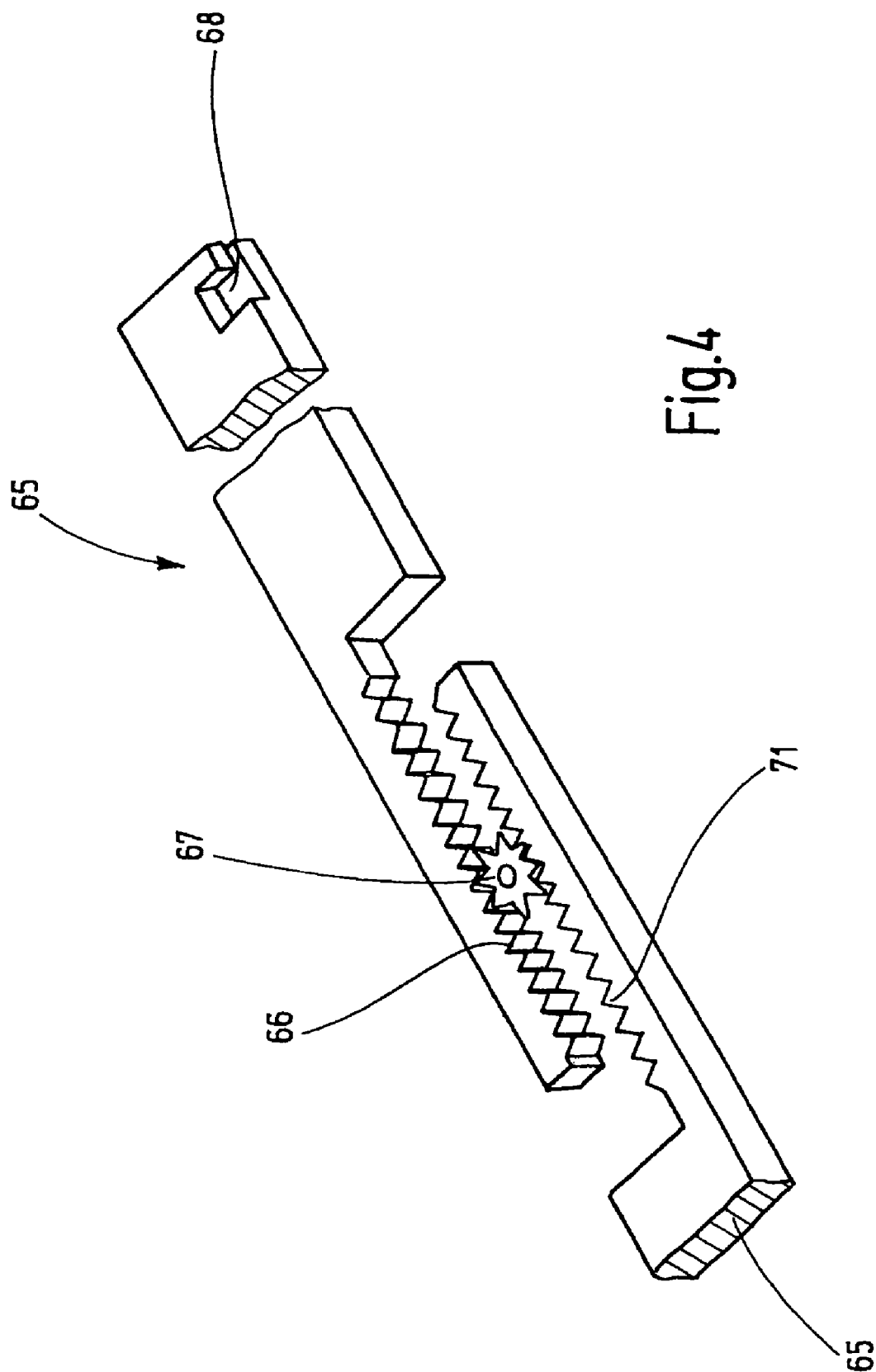
FIG. 4 is a fragmentary perspective of an end piece balancer for the center piece of the illustrated pull-out element.

If it is desired to positively maintain the guide rod in central relation to the end pieces, the arrangement shown in FIG. 4 can also be used. For this purpose, the guide rod 56 is connected to a coupling bar 65, which runs in the guide channel 47. The coupling bar 65 has as a toothed rack 66 at its end. The toothed rack 66 meshes with a gear 67, which is rotatably mounted on the center piece 39. This shaft is guided through corresponding bore holes on the bottom side and at the top side 42. For example, the shaft can be formed by a screw. In order to connect the coupling bar 65 to the guide rod 56, they also can be provided on the outer end with a pocket in which an appropriate complementary hook on the guide rod 56 engages.

A similar coupling bar is connected to the guide rod 56 of the other end piece 51. This coupling bar also transitions at its inner end into a toothed rack 71, which lies opposite the toothed rack 66 relative to the gear 67. By virtue of this mechanism composed of the two toothed racks 66, 71 and the rotary gear 67 that is mounted on a stationary axis, the movement of one of the two coupling bars 65 is transferred to the other coupling bar with the same stroke, but in the opposite direction of motion. Through the gear arrangement shown in FIG. 4 therefore, the center position between the two end pieces 41 can be maintained.

From the foregoing, it can be seen that the rear window roller blind of the present invention for motor vehicles has a pull-out element, which is provided with telescoping end pieces. The end pieces are shaped so that when the pull-out element is in the extended state, the pull-out slit in the rear-seat shelf is closed over its entire length by the pull-out element.

The invention claimed is:

1. A rear window roller blind assembly (22) for motor vehicles comprising:
   a wind-up shaft (23) mounted for rotational movement below a pull-out slit (12) adjacent a motor vehicle window,
   a roller blind (19) having one edge fixed to the wind-up shaft (23) and a free edge opposite the wind-up shaft (23), said roller blind (10) being movable between a retracted position about said wind-up shaft and extended position in which the roller blind (19) is pulled out through said slit (12);
   a pull-out element (21) fixed to the free edge of the roller blind (19), said pull-out element (21) having an elongated center piece (39) and two end pieces (41) that can move longitudinally relative to the center piece (39);
   said pull-out element (21) having a cross-sectional shape such that the center piece (39) together with the end pieces (41) close the pull-out slit (12) when the roller blind (19) is retracted, and
   a drive device (24, 35) for the wind-up shaft (23) for rotating the wind-up shaft (23) at least in a direction for winding up the roller blind (19) onto the wind-up shaft (23).

2. The rear window roller blind assembly of claim 1 in which said wind-up shaft (23) is rotatably mounted under a rear seat shelf (11) of the motor vehicle.

3. The rear window roller blind assembly of claim 2 in which said slit (12) is in said rear seat shelf (11) and extends over substantially the entire width of the rear seat shelf (11).

4. The rear window roller blind assembly of claim 1 in which said roller blind (19) has a trapezoidal shaped section, a short edge of which is fixed to the pull-out element (21).

5. The rear window roller blind assembly of claim 1 including guide rails (16) for guiding movement of the pull-out element (21) between extended and retracted positions.

6. The rear window roller blind assembly of claim 5 in which said guide rails (16) are integrated into lining parts (15) of the vehicle.

7. The rear window roller blind assembly of claim 1 in which said slit (12) has elongated slit edges (17, 18) which defines a predetermined width of the slit, and said pull-out element (21) has a transverse width at least as great as the width of said slit.

8. The rear window roller blind assembly of claim 1 in which said center piece (39) of said pull-out element (21) is an aluminum extrusion.

9. The rear window roller blind assembly of claim 1 in which said center piece (39) defines a continuous lengthwise chamber (47).

10. The rear window roller blind assembly of claim 1 in which said center piece (39) of said pull-out element defines at least two guide grooves (44, 45) which are continuous over the length of the center piece.

11. The rear window roller blind assembly of claim 1 in which said center piece includes a continuous groove (46) in which said free edge of roller blind (19) is anchored.

12. The rear window roller blind assembly of claim 1 in which said center piece (39) has a length corresponding at least approximately to the length of the free edge of the roller blind (19) away from the wind-up shaft (23).

13. The rear window roller blind assembly of claim 1 in which said center piece has a transverse height which is smaller than the transverse width of the center piece measured in a plane perpendicular to a longitudinal axis of the center piece (39).

14. The rear window roller blind assembly of claim 1 in which said center piece includes a plurality of grooves (44, 45) that extend length wise in the center piece, and said end piece (41) has guide parts (52, 55) that are movably held within said center piece grooves (44, 45).

15. The rear window roller blind assembly of claim 1 in which each said end piece (41) is bowl shaped with a base (48) and a collar (49) formed on the base (48), and said end piece each has a slit (51) which runs lengthwise of the end piece defined by a pair of elongated slit edges (52, 53).

16. The rear window roller blind assembly of claim 15 in which said center piece (39) is formed with at least one groove (44), and at least one of said slit edges (52) of each end piece is supported for relative movement within said center piece groove.

17. The rear window roller blind assembly of claim 1 including a guide piece (28) that projects outwardly from each end piece (41).

18. The rear window roller blind assembly of claim 17 in which each said guide piece (28) is positively secured to a respective end piece (41).

19. The rear window roller blind assembly of claim 1 in which said center piece (39) is formed with an elongated channel (47), elongated guide bars (56) mounted for telescopic movement within said center piece channel (47), and each end piece (41) being mounted about an end of one of said guide bars (56).

20. The rear window roller blind assembly of claim 19 in which each end piece is formed with an elongated slit (51), and each said elongated guide bar (56) is mounted in aligned relation with a respective end piece slit (51).

21. The rear window roller blind assembly of claim 1 including a toothed rack (66, 71) coupled with each end piece.

22. The rear window roller blind assembly of claim 21 including a gear (67) rotatably mounted on said center piece (39), and said toothed racks (66, 71) of said end pieces and said gear form a differential gear arrangement such that movement of one end piece (41) relative to the center piece (39) generates a movement of the other end piece (41) of equal magnitude but in an opposite direction.

23. The rear window roller blind assembly of claim 1 in which said drive device (24, 35) includes a spring motor (24) coupled to said wind-up shaft (23) for biasing said wind-up shaft in a wind-up direction of said roller blind.

24. The rear window roller blind assembly of claim 23 in which said drive device (24, 35) includes a gear motor (35) operable for moving linear activation elements (37, 38) to move said pull-out element (21) to an extended position.

25. The rear window roller blind assembly of claim 24 in which said linear activation elements (37, 38) are in the form of a flexible and bendable toothed rack.

26. The rear window roller blind assembly of claim 24 in which said activation elements (37, 38) comprise slide elements.

27. The rear window roller blind assembly of claim 24 including guide tubes (29, 31) for between said drive motor (35) and guide rails (16) for guiding movement of said activation elements (37, 38).

* * * * *